United States Patent
Fraillon

(10) Patent No.: US 7,575,651 B2
(45) Date of Patent: Aug. 18, 2009

(54) METHOD FOR APPLYING WEB MATERIAL TO A MOLDED PLASTIC OBJECT

(75) Inventor: Patrick Fraillon, Mamaroneck, NY (US)

(73) Assignee: Alcan Packaging Beauty Services, Gennevilliers (FR)

(*) Notice: Subject to any disclaimer, the term of this patent is extended or adjusted under 35 U.S.C. 154(b) by 59 days.

(21) Appl. No.: 11/557,608

(22) Filed: Nov. 8, 2006

(65) Prior Publication Data

US 2008/0106006 A1    May 8, 2008

(51) Int. Cl.
*B65D 23/00* (2006.01)
(52) U.S. Cl. ............... 156/213; 156/212; 132/293; 215/12.2
(58) Field of Classification Search ............ 156/212; 132/293; 215/12.2
See application file for complete search history.

(56) References Cited

U.S. PATENT DOCUMENTS

| 3,031,072 A | 4/1962 | Kraut |
| 3,299,604 A * | 1/1967 | Kraut ................ 53/427 |
| 3,899,122 A * | 8/1975 | Watts, Jr. .......... 229/198.2 |
| 6,186,348 B1 * | 2/2001 | Rouet ................ 215/12.1 |
| 2004/0182413 A1 * | 9/2004 | de Laforcade ...... 132/293 |
| 2005/0081985 A1 * | 4/2005 | Abrams .............. 156/230 |

* cited by examiner

*Primary Examiner*—Jeff H Aftergut
*Assistant Examiner*—Jaeyun Lee
(74) *Attorney, Agent, or Firm*—Banner & Witcoff, Ltd.

(57) ABSTRACT

A method for applying web material to a substrate object. Web material on a thermoformable sheet can be adhered to the shaped object with a heat-actuated adhesive in a vacuum thermoforming process.

18 Claims, 1 Drawing Sheet

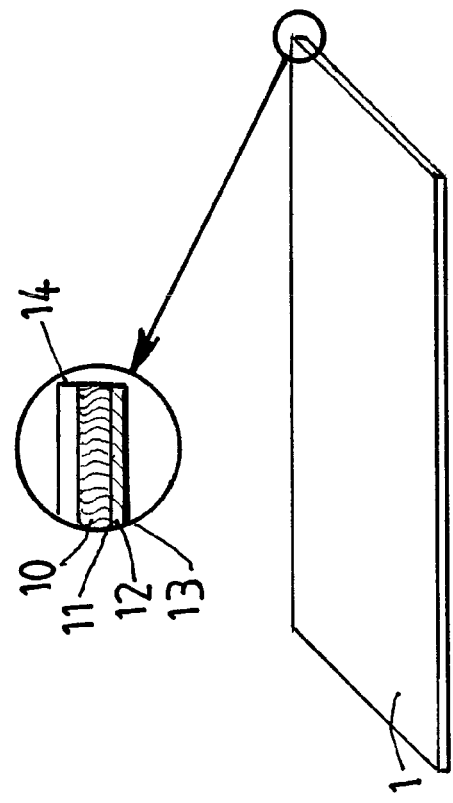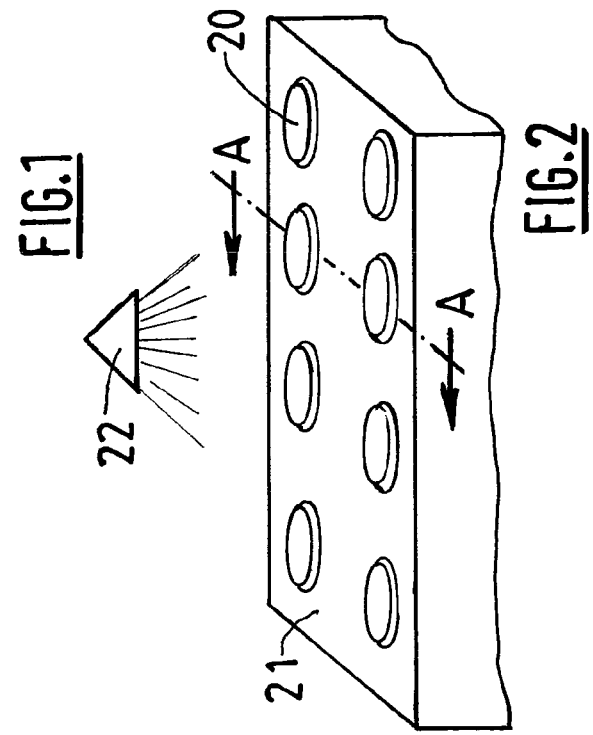

METHOD FOR APPLYING WEB MATERIAL TO A MOLDED PLASTIC OBJECT

FIELD OF THE INVENTION

This invention, in certain aspects, relates to a method for applying web material to a shaped object. In particular, aspects of the invention relate to a method for applying a web material such as fabric to a precisely molded plastic object such as a package for a cosmetic product.

BACKGROUND OF THE INVENTION

Decoration of and placement of ornamental materials on packaging materials often is used to make the package visually appealing to potential purchasers. Such decoration and ornamentation is used to distinguish one product from another and to attract potential purchasers, for example. Attractive packaging is important in attracting purchasers. Packaging decoration also can be used to, for example, illustrate the content of an opaque package.

Ornamentation and decoration can be formed as part of the package material. For example, a pattern or design can be formed as part of the container. Examples of such patterns or designs include random patterns formed by mixing of plural plastics during injection molding or by placing particles into a mold to become part of another material cast therein. Similarly, a pattern formed in a mold will form a design in the surface of the material molded therein.

Packages also can be etched or machined to form ornamentation thereon. For example, an area of matte or pebbled finish, for example, can be introduced onto a molded or cast object by, for example, finishing the mold with the appropriate texture or by etching or sandblasting the resultant object.

Decoration and ornamentation can be easily achieved when the material used to form the decoration and the material of the object to be decorated can be subjected to the same type of material processing conditions to form the ornamented package. For example, plastics that are compatible and that can be formed in a forming process can be combined in a single step to form a decorated package. Similarly, a metal piece or decalcomania can be applied to an object in a separate processing step.

However, it is difficult to combine unlike or otherwise incompatible materials to form a decorated or ornamented package. For example, it may be difficult to prevent a thin or flexible material from wrinkling, deforming, or ripping when applied to a substrate object. Also, when the substrate object also is a package, the package often must maintain or be formed with a desired degree of precision, and the method by which a decoration or ornamentation is attached cannot adversely affect the substrate package.

It may be difficult to orient a design on the package. A desired orientation first must be achieved during placement of the web material, such as in a mold. Then, this correct orientation must be maintained under processing conditions required to form the substrate package.

Application of a fabric web to an injection molded product presents difficulty. Both orientation and deformation issues, amongst others, may be presented when trying to decorate an injection molded product with a fabric web. To manually or automatically load a fabric web insert into a mold typically requires complex mechanisms to ensure that the insert is placed and remains in the correct orientation. For example, complex robotics can be required to automatically place and correctly orient a fabric web insert. Manual placement and orientation are labor intensive and tedious. Further, often only thick or rigid web inserts can withstand injection molding pressures, particularly pressures required to form precision parts. Such inserts often do not provide the decorated product with a texture or a visual presentation found pleasing by purchasers of the package.

Thus, there exists a need for a method for forming an object covered with a web material that provides a desired visual and textural presentation. There also exists a need for a method for forming a substrate object covered with a web of material that cannot withstand the handling technique required to form the substrate object. There also exists a need for a method for covering a precisely-formed substrate object with a web material.

The cosmetic packaging industry has a particular need for attractive packaging. Further, the package parts often must be precisely made to ensure that the content of the container does not leak out or escape from the closed packaging. Typically, such packaging includes compacts and applicators that have handles that also serve to seal the package. One example of such a package is a mascara brush that is self-storing in the mascara container, wherein the handle of the brush also serves as the closure cap for the container. Such pieces often are made by molding plastic, typically by injection molding. These pieces must have a precise fit. Covering parts or all of such objects provides a visually pleasing appearance that also can include a desired tactile experience.

Thus, there exists a particular need for a method for forming a container covered with a web material for cosmetics.

BRIEF SUMMARY OF THE INVENTION

An aspect of the invention is directed to a method for applying a web material to a substrate object. In accordance with a first embodiment of the invention, a decorative web material adhered to a first surface of a thermoformable material having a heat-activated adhesive or glue on a second, opposite surface is adhered to an object in a vacuum thermoforming process.

In a second embodiment, the object is a precisely molded object that forms a part of a container for cosmetics.

In a third embodiment, a releasable layer is applied to the top surface of the web material to protect it from processing conditions during the thermoforming process.

BRIEF DESCRIPTION OF THE DRAWINGS

FIG. 1 shows a sheet of thermoformable material having a fabric web adhered on one side and a layer of heat-activated adhesive or glue on the opposite side.

FIG. 2 shows a vacuum forming mold with substrate objects placed thereon.

FIG. 3 illustrates the processing steps of the invention using section A-A of FIG. 2.

FIG. 4 shows a section view of a decorated product formed in accordance with the invention.

DETAILED DESCRIPTION OF THE INVENTION

An aspect of the invention is directed to a method for applying web material to a substrate object. In particular, aspects of the invention are directed to a method for applying web material to a substrate object in a vacuum thermoforming process.

In accordance with a method of the invention, the substrate object can be any item that can be processed in a vacuum thermoforming process. Thus, the object can be formed in any manner from plastic, metal, wood, or any other material.

However, the invention often will be described herein with respect to a molded plastic article that is part of a container for cosmetics. Typically, such objects are precisely-molded objects. Thus, for convenience and without limitation on the invention, the method of the invention will be described with regard to molded plastic objects.

In accordance with one embodiment of the invention, the web material applied to a thermoformable sheet having a heat-activated adhesive on the opposite side is adhered to a molded plastic object in a vacuum thermoforming process. The thermoformable sheet is heated to soften the plastic as part of the vacuum thermoforming process, and the heat-activated adhesive is activated to adhere the sheet, and the web attached thereto, to the molded plastic object. The resultant covered product then is separated from the remaining portions of the thermoformed sheet, i.e., those portions of the sheet on a vacuum table rather than on a substrate object.

In accordance with a second embodiment of the invention, heat for the thermoforming process is provided by radiation from above a vacuum forming mold. The web material is covered with a releasable protective sheet. The releasable protective sheet protects the web material from any deleterious effects resulting from exposure to heat from above, such as melting or burning. The releasable protective sheet is removed from the web material after the thermoforming process.

In accordance with a third embodiment of the invention, the precisely-molded object is a cosmetic package, such as a compact, a container for mascara, a lipstick container, or another container for cosmetic that must be precisely formed to ensure that the product is retained in the product when the package is closed. For example, compacts and mascara or lipstick containers must retain the product therein. Similarly, shaped containers, such as perfume bottles, can be decorated or labeled by the practice of the method of the invention.

Skilled practitioners recognize that a vacuum thermoforming process combines heat to achieve a desired temperature in a sheet to be applied and vacuum to deform that sheet under appropriate conditions. That is, a sheet is heated to a temperature sufficient to soften the sheet and make it amenable to vacuum formation or molding. The process can be used to form a sheet in a mold or over other objects, for example. For example, the depth to which a sheet can be vacuum formed is related, inter alia, to the width of the form and the deformability of the sheet. Whereas for one embodiment of a sheet it may be possible to form a sheet to a depth of 1 inch if the width of the form is 6 inches, it may not be possible to form that same sheet to that depth if the width of the form is only 1 inch. Also, the web material must stretch sufficiently to form the desired shape.

The shape of the mold or the object to be covered is limited only by the ability of the sheet to attain the desired shape. Skilled practitioners recognize that the ability of the sheet to attain the desired shape can be related, inter alia, to the thickness of the sheet, the temperature at which the process is carried out, the rate at which the sheet is heated, and the softening temperature of the sheet. Thus, the processing parameters, including inter alia the heat rate, temperature, vacuum strength, and sheet composition and thickness, can be selected by the practitioner with the guidance provided herein, to achieve the desired result.

FIG. 1 illustrates an embodiment of the web material applied to the thermoformable sheet to form applied sheet 1. Web material 10 to be attached to an object to be covered is attached to a thermoformable sheet 12. The material is attached by glue, adhesive, or any suitable material 11. The thermoformable sheet 12 has heat-activated adhesive or glue 13 on the side opposite the web material. Optional release layer 14 is releasably applied to the top surface of web material 12. The combination of two or more layers 10, 11, 12, 13 and/or 14 can be referred to as a sheet system.

Web material 10 can be any web material suitably used to cover another object. The web can be woven or unwoven, and can be synthetic or natural material. A woven fabric is intended to include loomed, knitted, crocheted, or any other structured fabric. For example, the web may be a woven or knitted cotton material. Alternatively, the material may be a synthetic composition, such as nylon (polyamide), polypropylene, or any other synthetic composition. Also, the web can be a flocked material. Leather, synthetic leather materials, such as Naugahyde, and sueded materials also are suitable as web material 10.

The appearance of web material 10 is not limited. For example, the material can be solid color, a fixed or random pattern, such as a plaid or abstract, or any other design. For example, the appearance can be in the form of a flower, a logotype, or advertising message.

Each of the component parts of applied sheet 1 should be amenable to vacuum thermoforming. Thus, as the skilled practitioner recognizes, the web material is required to stretch so as to assume the form of the object being covered. Similarly, the releasable layer, if present, also must be stretchable. With the guidance provided herein, the skilled practitioner will be able to identify suitable web material.

The web material can be attached to the thermoformable sheet in any manner known to a skilled practitioner to ensure secure attachment that will resist undesired deformation of the material. Typically, the material may be glued or otherwise adhered to the thermoformable sheet. If glue is used, it can be screened, applied by doctor blade, or sprayed onto either the fabric or the thermoformable sheet, for example. This adhesive material is indicated by reference numeral 11 in the Figures.

Web material 10 can be attached to thermoformable sheet 12 in a way so that any design or particular decoration is correctly oriented when applied sheet 1 is placed over the objects to be covered.

Thermoformable sheet 12 is formed of material that is processable by thermoforming. Skilled practitioners recognize that thermoformable materials can be selected from a wide range of products, including, for example, polycarbonate. The thickness of the thermoformable sheet should be appropriate to enable proper application of the sheet to the object.

Heat-activated glue 13 also can be selected by the skilled practitioner as a glue or adhesive that activates at the temperature expected to be used in the thermoforming process.

Releasable layer 14 can be applied to the top surface of the web material 10. Typically, the purpose of the releasable layer is to protect the web material from processing conditions during the thermoforming process. Typically, the protection required is against heat from above the vacuum mold. Therefore, the releasable layer then is resistant to heat and protects the web material from, for example, melting upon exposure to the heat required to thermoform the sheet. A releasable layer also can be used to protect against any type of damage to the web material. The skilled practitioner recognizes that the releasable layer is applied to the web material with glue or adhesive that has a low release value so that it can be removed from the web material without damaging the web material.

Applied sheets are commercially available. Such sheets also can be used to form appliqué material for, for example, decorated clothing, such as a decorated tee-shirt. One such product, comprising nylon flocking on polycarbonate sheet, is available commercially from well-known industry suppliers.

FIG. 2 illustrates an embodiment of aspects of the invention. FIG. 2 illustrates substrate objects 20 in place on vacuum forming mold 21. The objects are arranged on the mold in any manner suitable for vacuum forming of applied sheet 1. Vacuum is drawn downward, typically by a vacuum pump or source (not shown), when applied sheet 1 has attained the necessary properties and characteristics, such as flexibility sufficient to be formed by vacuum. Heat source 22 can be located above the vacuum mold to provide heat to soften applied sheet 1 when it is put in place in the practice of the method of the invention. The heat source is one typically used in vacuum forming processes.

FIG. 3 illustrates processing steps of an embodiment of the invention in relation to section A-A of FIG. 2. In FIG. 3A, objects 20 are put in place on vacuum mold 21. As shown in FIG. 3B, applied sheet 1 is placed in correct orientation over the objects 20 on vacuum mold 21. Then, heat from heat source 22 is applied to soften applied sheet 1 and to activate the heat-sensitive adhesive applied thereon so that when a vacuum is drawn through vacuum mold 21, applied sheet 1 assumes the form of the objects 20 and of the vacuum mold therebetween, and becomes adhered to objects 20. The vacuum is released, and the sheet with the covered objects attached thereto, which is shown in FIG. 3D, is separated from the vacuum mold.

The covered objects then are separated from the remaining parts of applied sheet 1, which now is scrap, and recovered. The object can be separated in any way, such as by die cutting, known to the skilled practitioner. If releasable layer 14 is present, it can be removed before or after the covered objects are separated from the scrap.

A covered object formed in accordance with the method of one embodiment of the invention is illustrated in FIG. 4.

The method of the invention has many advantages. In embodiments, registration, or orientation of the covering material with the substrate objects, can be easily accomplished; the need for labor-intensive insertion of inserts into a mold, or complex automatic insertion thereof, can be eliminated; more delicate fabrics can be used in the method of the invention because the fabric is not exposed to extreme processing conditions; and the web material is less likely to suffer deformation, such as wrinkles and bunching. The number of objects that can be covered in one process step is limited only by the size of the vacuum mold. The substrate object can be precisely formed in a typical process for forming such objects, without having to take special precautions for a fabric insert.

EXAMPLE 1

A thermoformable, 5-mil polycarbonate sheet having a 30-mil flocked nylon web adhered thereto with 2-mil thick glue on one face and heat-activated adhesive on the opposite face was produced. The nylon web had a protective sheet of 5-mil polycarbonate releasably adhered thereto. The sheet was placed over 24 precisely-formed injection-molded SAN compact lids arranged on a vacuum forming table. The assembled sheet and lids were heated with overhead infrared radiation until the sheet began to form around the lids at a temperature of about 840 F applied for about 2 seconds. Then, vacuum was applied to the sheet, within about 2 seconds after the heating at about 840 F began, to form the sheet and adhere the sheet to the lids. The covered lids then were die-cut from the remainder of the sheet.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

The invention claimed is:

1. A method for applying a web material to a substrate for a cosmetic comprising:
   (a) placing a sheet system comprising, in order, a web material, a thermoformable sheet, and a heat-sensitive adhesive on a substrate arranged directly in contact with a vacuum mold with the heat-sensitive adhesive toward the substrate,
   (b) heating the sheet system to soften the thermoformable sheet and activate the heat-sensitive adhesive, and
   (c) drawing a vacuum through the vacuum mold to draw the sheet system to the substrate, wherein a portion of the sheet system is thereby formed and adhered to the substrate.

2. The method of claim 1 wherein the web material comprises flocked material.

3. The method of claim 1 wherein the substrate for a cosmetic is a cosmetic compact.

4. The method of claim 1 further comprising separating the substrate with the portion of the sheet system adhered thereto from the remainder of the sheet system.

5. The method of claim 4 wherein the separating is accomplished by die cutting.

6. The method of claim 1, wherein the sheet system further comprises a protective layer releasably adhered to the web material, and the method further comprises removal of the protective layer after the portion of the sheet system is adhered to the substrate.

7. The method of claim 1 wherein the web material is adhered to the thermoformable sheet and the heat-sensitive adhesive is adhered to the thermoformable sheet.

8. A method for covering a compact lid with a web material comprising:
   (a) contacting a sheet system with a compact lid, wherein the sheet system comprises a web material adhered to a first side of a thermoformable sheet and a heat-sensitive adhesive on a second side of the thermoformable sheet opposite the first side, and wherein the compact lid is arranged directly in contact with a vacuum mold,
   (b) heating the sheet system to soften the thermoformable sheet and activate the heat-sensitive adhesive,
   (c) applying a vacuum to form the sheet system to the compact lid and adhere the sheet system to the compact lid.

9. A method for decorating a plurality of cosmetic objects comprising:
   placing a sheet system in contact with a plurality of cosmetic objects, applying heat to the sheet system, and applying a vacuum to the sheet system, such that a first portion of the sheet system becomes formed and adhered to a first one of the plurality of the cosmetic objects and a second portion of the sheet system becomes formed and adhered to a second one of the plurality of cosmetic objects resting directly on a support; and
   wherein the sheet system comprises a web material and a thermoformable sheet.

10. The method of claim 9 further comprising separating the first one of the plurality of the cosmetic objects with the first portion of the sheet system adhered thereto from the remainder of the sheet system.

11. The method of claim 9 wherein the sheet system further comprises an adhesive.

12. The method of claim 11 wherein the sheet system further comprises a release layer and wherein the adhesive comprises a heat-sensitive adhesive.

13. The method of claim 9 wherein the web material is adhered to a first side of the thermoformable sheet and the adhesive is adhered to a second side of the thermoformable sheet.

14. The method of claim 11 wherein the cosmetic object is chosen from the group consisting of a cosmetic compact lid, a perfume bottle and a lipstick holder.

15. The method of claim 11 wherein the step of applying heat to the sheet system comprises applying an infrared heat from above the sheet system.

16. The method of claim 10 further comprising the step of arranging the plurality of cosmetic objects on a vacuum table prior to placing the sheet system in contact with the plurality of cosmetic objects.

17. The method of claim 11 wherein the web material is a woven fabric.

18. The method of claim 11 wherein the web material is an unwoven, synthetic material.

* * * * *